United States Patent [19]

Hierholzer, Jr. et al.

[11] 4,443,361

[45] Apr. 17, 1984

[54] SILICON CARBIDE RESISTANCE ELEMENT

[75] Inventors: Frank J. Hierholzer, Jr., Florissant; Gerald L. Shelton, St. Louis, both of Mo.

[73] Assignee: Emerson Electric Co., St. Louis, Mo.

[21] Appl. No.: 481,448

[22] Filed: Apr. 1, 1983

Related U.S. Application Data

[62] Division of Ser. No. 236,377, Feb. 20, 1981.

[51] Int. Cl.$^3$ .............................................. H01B 1/04
[52] U.S. Cl. ................................. 252/516; 219/270; 219/553; 252/62.3 R; 252/518; 338/330; 427/94; 427/249; 428/364
[58] Field of Search ......... 219/270, 121 LM, 121 LF, 219/543, 552, 553; 361/264, 265, 266; 338/262, 287, 280, 281, 330, 331; 427/50, 51, 52, 94, 123, 58, 249, 255, 255.2, 255.4, 255.5, 255.7; 264/61; 252/62.3 R, 516, 518; 373/134; 428/364, 376

[56] References Cited

U.S. PATENT DOCUMENTS

| | | |
|---|---|---|
| 1,906,963 | 5/1933 | Heyroth .............................. 338/330 |
| 2,003,592 | 6/1935 | Hediger .............................. 428/376 |
| 2,095,253 | 10/1937 | Heyroth .......................... 361/264 X |
| 3,393,038 | 7/1968 | Burkhalter et al. ............. 361/265 X |
| 3,764,776 | 10/1973 | Hierholzer, Jr. et al. ... 219/121 LM |
| 3,875,477 | 4/1975 | Fredricksson et al. ............. 361/264 |
| 3,895,219 | 7/1975 | Richerson .......................... 219/553 |
| 4,125,756 | 11/1978 | Hierholzer, Jr. et al. ... 219/121 LM |
| 4,194,028 | 3/1980 | Sirtl et al. ............................ 427/249 |
| 4,205,363 | 5/1980 | Boos et al. .......................... 361/264 |
| 4,315,968 | 2/1982 | Suplinkas et al. .................. 428/367 |
| 4,328,529 | 5/1982 | Hierholzer et al. .................. 361/266 |

FOREIGN PATENT DOCUMENTS

| | | | |
|---|---|---|---|
| 488927 | 12/1952 | Canada ................................ 338/327 |
| 1366244 | 6/1964 | France ................................ 338/330 |

*Primary Examiner*—Volodymyr Y. Mayewsky
*Attorney, Agent, or Firm*—Polster, Polster and Lucchesi

[57] ABSTRACT

Silicon carbide shapes of the general type shown and described in U.S. Pat. No. 4,125,756 are densified and nitrided in such a way as to produce shapes with improved durability and reduction in temperature span in response to voltage changes.

1 Claim, No Drawings

4,443,361

SILICON CARBIDE RESISTANCE ELEMENT

This is a division of application Ser. No. 236,377, filed Feb. 20, 1981.

BACKGROUND OF THE INVENTION

This invention relates to an improved silicon carbide shape of the general type shown and described in U.S. Pat. No. 4,125,756. The shapes produced by the method described in that patent are densified by dipping them in furfural, subjecting the furfural coated shapes to fumes of hydrogen chloride, coated with silicon, and heated. It has been known for a long time to apply coatings of silicon carbide to shapes of carbon e.g. graphite, or of carburized or otherwise preliminarily coated refractory metals such as tungsten, by exposing the shapes to gas containing a halogenated silane such as methyltrichlorosilane. The prior art methods were suitable for deposition of silicon carbide on dense substrates, but not upon the porous, incompletely bonded granular body of the shape of the type described in U.S. Pat. No. 4,125,756. The prior art is represented by U.S. patents to Wainer, U.S. Pat. No. 2,690,409, and Clendinning U.S. Pat. No. 3,317,356, and British Pat. No. 955,700. Of these references, only the British patent suggests that silicon carbide might be suitable as a substrate. However, it is clear from the description in the British patent that a transparent, glassy, probably monocrystaline silicon carbide layer is to be deposited, and to this end, the British patent is emphatically specific to heating the shape itself to temperatures in the range of 1450° to 1600° C., before exposing it to the treating gas. For the production of resistance elements from the shapes produced by the impingement of a laser bean on a bed of unconsolidated particles of silicon carbide, this method is unsatisfactory. In accordance with the process of this invention, a polycrystaline, almost mud-like coating is provided, at deposition temperatures that are relatively low and deposition rates that are relatively high compared with the deposition temperatures and rates of the methods of deposition of monocrystaline material.

One of the objects of this invention is to provide a process of densification and subsequent nitriding that produces a more uniform, durable, and temperature stable shape from a partially bonded granular silicon carbide substrate than those known heretofore.

Other objects will become apparent to those skilled in the art in the light of the following description and accompanying drawing.

SUMMARY OF THE INVENTION

In accordance with this invention, generally stated, a porous, partially bonded, granular silicon carbide body of precisely controlled electrical resistance is given a dense coating of polycrystaline silicon carbide by chemical vapor deposition (CVD) in a hot wall furnace at temperatures between about 1000° and 1400° C., followed by a silicon nitride coating. The result of this treatment is to produce a body that is much stronger than it was before the treatment. The body will form very little quartz when operated at 3200° F., which both increases the life of the body in use and minimizes clean up in the manufacturing process. The body also is given a narrower range of change in temperature with changes in voltage. Furthermore, the nitriding of the preferred process of this invention is done in a way that increases the conductivity of the silicon carbide and makes the flow of current through the body more uniformly distributed. The nitriding improves the operation of the body in either an oxidizing or a reducing atmosphere, reducing its susceptibility to oxidation and to silicon monoxide evaporation. In the preferred embodiment, in which an ohmic contact is embedded in the silicon carbide body, the silicon nitride is formed in such a way as not to interfere with that contact. The silicon nitride in the preferred method is laid down with the thickest protective coating where it is most needed, in the hottest portion of the body. The preferred process reduces the intensity of any hot spots in the body, to provide a more uniform heating of the body, which also helps to increase the life of the body. Lastly, the surface of the body is further sealed by the silicon nitride, any remaining pores tending to close with silicon nitride growth.

DESCRIPTION OF THE PREFERRED EMBODIMENT

In the preferred embodiment of this invention, a shape, either in the form of an igniter element or larger heating element, is formed by one of the methods described in U.S. Pat. Nos. 3,764,776 and 4,125,756, preferably by directing onto the surface of a bed of unconsolidated particles primarily of silicon carbide, a laser beam with energy sufficient to bond, but not completely to fuse, the particles, to form a coherent element, moving the bed and laser beam relative to one another in a progression to form a desired shape with ohmic contacts in two ends of the shape, and removing the rind that is formed from the core of the shape.

As is explained in the latter patent, the resulting product is porous and granular, the silicon carbide grains being only partially bonded, in the sense that they are not wholly fused. At the same time, even immediately after their formation, elements in any run of elements formed by this method have uniform resistance characteristics, within plus or minus 5% of one another, and in this sense will be referred to as being of precisely controlled electrical resistance.

Preferably the shapes are now suspended by the ohmic contacts, spaced apart along racks supported by boats, and the boats are placed within a furnace chamber which is then sealed. The furnace chamber is heated to approximately 1270° C. A current of gas consisting of hydrogen as the carrier, methyltrichlorosilane (MTS) in the amount of about 0.0025 lbs. per liter of gas, and about 0.1% by weight nitrogen, is introduced to the furnace chamber. Preferably the gas is preheated to about 700° F., to help maintain the furnace temperature. In this embodiment, a gas flow rate of about 4 liters per minute per square inch of furnace cross-section is used, but the rate of gas flow, the preheating temperature, and to some extent, the amount of MTS in the deposition gas is dependent upon the capacity of the furnace and the mass of the shapes being treated. If the flow is too fast or if too much MTS is present, spikes will form. If it is too slow, the deposition time is increased. The preheating of the gas is limited by the decomposition of the MTS, premature decomposition of which leads to deposition on the walls of the preheating chamber.

The inclusion of some nitrogen in the chemical vapor deposition (CVD) gas has been found to lower the room temperature resistance of the device, apparently by trapping atomic nitrogen in layers of silicon carbide. By adding the nitrogen, any other impurity from the furnace chamber and gases is swamped out, so that the doping of the deposited silicon carbide is made more uniform than it would be otherwise.

Preferably, the boats by which the shapes are carried in the furnace are connected to docking probes on push rods that project from the furnace chamber. The push rods are reciprocated during the treatment, so that the shapes are moved, to break up any static flow pattern of the gas. The gas itself is introduced at high velocity through an orifice, from which it expands to hit the top of the furnace and "explode" across the parts. In this embodiment, igniter shapes (approximately 2¼" long, including ohmic contacts, 1" wide and ¼" thick at the terminal end and ⅛" thick in the serpentine hot zone) are mounted in groups of five, one inch apart, suspended with the plane of their upper surfaces perpendicular to the long axis of the furnace chamber, which is elongated. The boats are reciprocated through two or three inches. However, the spacing of the elements and the amount of movement can and will be varied with the size and configuration of the furnace chamber and the types of shapes being treated.

For the igniter shapes described, which weigh approximately 1.4 grams before the CVD treatment, a dwell time of 30 to 45 minutes will produce a weight gain of approximately 1.2 grams. Because the substrate shapes are so porous, and because the CVD deposition under the conditions described penetrates the shape a substantial distance, the desired amount of deposition is generally determined by weight gain rather than coating thickness.

When the desired amount of silicon carbide has been deposited, the shapes are removed from the furnace and, in the preferred embodiment described, in which the shapes are provided with embedded metal terminals, the terminal regions of the bodies are sprayed with aluminum or other suitable metal to ensure that ohmic contact between the metal terminal and the silicon carbide is maintained throughout the life of the element. Only the part of the body immediately around the embedded metal terminals is spray metallized, although the entire body is densified.

Following the spray metallization, temporary electrical connections are made to the two metal terminals on the element. A cover is placed over the element and pure nitrogen is flushed into the cover. Thus the element is surrounded only by nitrogen. Electrical power is applied to the two terminals until the body reaches about 3300° F. in its hottest region. In the case of the igniters, this temperature is maintained for about two minutes. In production, the wattage of the body is monitored rather than its temperature, determined by a calibration curve of wattage versus temperature for a given design for the particular fixture.

Nitriding takes place very rapidly within the silicon carbide of the element. In practice, the element produced and treated by the CVD process described has some excess silicon, which forms silicon nitride on the outermost surface. The silicon nitride forms a denser layer on the hottest parts of the element than it does on the less hot parts. In addition, the nitrogen diffuses into the body beyond the silicon nitride skin and effectively dopes the silicon carbide, forming a layer of low-resistance silicon carbide just beneath the silicon nitride skin. Because the doping and silicon nitride formation are functions of the temperature of the element, the process produces a self-equalizing effect upon the current flow, and consequently the temperatures throughout the element. Thus, if a hot spot exists during the nitriding process, nitrogen will diffuse into that area faster and deeper, which will in turn decrease the resistance and tend to eliminate the hot spot. Again, the length of time during which the element is exposed to nitrogen will depend upon the character and dimensions of the element. In general, the silicon nitride formation and nitrogen diffusion take place in two to five minutes, as evidenced by a pronounced increase in current if a fixed voltage is applied, during the first two to five minutes, followed by a sharp decrease in the rate of increase. This phenomenon demonstrates the effect of the nitrogen doping beneath the silicon nitride skin, because silicon nitride itself is an electrical insulator, and its deposition would logically result in a decrease in current at a consant voltage, rather than an increase.

When the element is removed from the nitriding fixture, the parts of the body which were hottest have a different color from the cooler parts and the surface texture in those areas is also different. No unusual growth is present and the element looks "clean." If the element is operated in air after nitriding, oxygen attack is minimal. In the absence of the nitriding, the body will grow quartz rapidly at 3200° F. The quartz balloons from the body and stretches across the serpentine reaches of the igniter. Although the quartz does not electrically short out portions of the body, the element looks bad, and the quartz growth indicates that silicon and carbon have been removed from portions of the body, which makes those portions liable to develop hot spots. The nitriding not only improves performance of the element in an oxidizing atmosphere, but in slightly reducing atmosphere as well. In such an atmosphere, silicon monoxide is formed in an untreated element. Silicon monoxide evaporates at temperatures above 2200° F. Evaporation of silicon monoxide and carbon monoxide from the body increases its resistance, and the element fails within a relatively short period of time, i.e., 1000 hours or so. With the silicon nitride film, the formation of silicon monoxide appears to be retarded.

Still another benefit of the nitriding process is the decrease of the temperature range with changes in voltage. For example, untreated igniters that would measure 2050° F. at 80 volts and 3050° F. at 132 volts, a temperature span of 1000° F. will, when nitrided in accordance with the process described, measure 2150° F. at 80 volts and 3050° F. at 132 volts, a temperature span of 900° F. Because most heaters and igniters must be designed to tolerate large variations in applied line voltage, this narrowing of the temperature span is important. In addition, because the nitriding tends to increase the temperature achieved at the lower range of voltages, the same temperature can be attained at a lower voltage than that required by the untreated element.

In performing the nitriding process, the elements can be separated into batches in accordance with their room temperature resistance, and those with high resistance can be heated to higher temperatures to adjust the resistance of the nitrided element downwardly to a greater degree than the elements with lower resistivity at room temperature.

The process of this invention has been described as applied to relatively small igniter elements. It is applicable to much larger elements, as for example, furnace heating elements 18" long, approximately ⅞" wide and ⅞" deep in their hot section and 1⅜"×1¾" at their ends, U-shaped in transverse cross-section with a wall thickness of between about ¼" in the hot section and 5/16" at the ends. Alternatively to increasing the cross-sectional area of the ends to reduce the temperature at the terminals in the operation of the elements, an additive such as silicon or molybdenum disilicide powder to reduce the resistance can be used in those discrete terminal end areas when the porous substrate is formed.

The elements may not have metal contacts, although it is preferable to provide them. When metal contacts are employed, they must be capable of resisting attack by the hydrogen, or when halogenated silanes are used, the hydrogen and halogen of the CVD gas at the high temperatures involved. Molybdenum or tantalum contacts are eminently satisfactory.

The temperatures and other conditions described above have been found to be optimum for the particular elements and equipment involved, but, as has been indicated, some of the conditions and temperatures will be varied when different elements and different equipment are involved. The furnace temperature must be in the 1000° to 1400° C. range. Operating the furnace toward the upper end of the range improves (narrows) the temperature range of an igniter element, but temperatures above 1400° C. do not produce the desired polycrystaline structure. The preheating of the CVD gas is not as critical, except for the decomposition of the MTS or its effect upon the equipment if the temperatures are raised much above 800° C., and except for the cooling effect on the furnace and elements being treated if the temperature of the gas is too low. In the nitriding process, the temperature of the element must be high enough to produce atomic nitrogen and low enough to avoid subliming silicon nitride as fast as it is deposited, and to this end, the range should be in the oder of 3200° to 3500° F.

The amount of MTS in the CVD gas can be varied, but it has been observed that the more MTS, the more carbon rich the treated elements become, which tends to produce instability in the elements because the carbon burns out. Too little MTS produces an inferior part because the silicon carbide is not formed properly. The exact amount of MTS optimum for a particular type of element, furnace, gas flow, and set of temperatures, can readily be determined in the light of the example given. The amount of nitrogen in the CVD gas can be varied through a considerable range, for example, 0.01 to 3% by weight of the gas. The use of 0.1% provides sufficient nitrogen to flush out other impurities. The use of more than 3% begins to interfere with the quality of the coating.

Numerous variations in the process and the resulting products of this invention, within the scope of the appended claims, will occur to those skilled in the art in the light of the foregoing disclosure. Merely by way of example, other materials besides MTS may be used as the source of silicon and carbon. Alternative sources are listed in U.S. Pat. No. 3,317,356, column 5, lines 37 et seq. Nitrogen, either as molecular nitrogen or in the form of gaseous ammonia or the like can be introduced into the deposition furnace at the end of the cycle, or silicon nitride can be vacuum sputtered onto the element. However, the resulting nitriding in either of these approaches is far inferior to the preferred embodiment described. No hot spot correction results in either of them, and in the former, effective spray metallization of the terminal ends is made difficult if not impossible, because, as has been pointed out, silicon nitride is an electrical insulator, and the spray metallization will not ensure ohmic contact between the conductive part of the element and the terminal. Other methods of forming porous substrates, some of which are disclosed in U.S. Pat. Nos. 4,124,756 and 3,764,776, can be used. Dopants different from nitrogen can be introduced in the CVD gas. These are merely illustrative.

We claim:

1. A silicon carbide resistance element comprising an elongated silicon carbide shape having a coating of silicon carbide on it denser than its substrate, and a coating of silicon nitride on said coating of silicon carbide, said silcon carbide shape without the silicon nitride coating having at least one hot spot along its length when current is sent through it, said shape is doped with nitrogen, and doping of the shape at said hot spot is deeper than doping at areas of said shape outside said hot spot, whereby variations in the heating of parts of the doped shape with the passage of current therethrough are minimized.

* * * * *